Sept. 18, 1951 W. M. WISEMAN 2,568,263
COMBINATION WRENCH AND ELEVATOR
Filed July 20, 1945 3 Sheets-Sheet 1
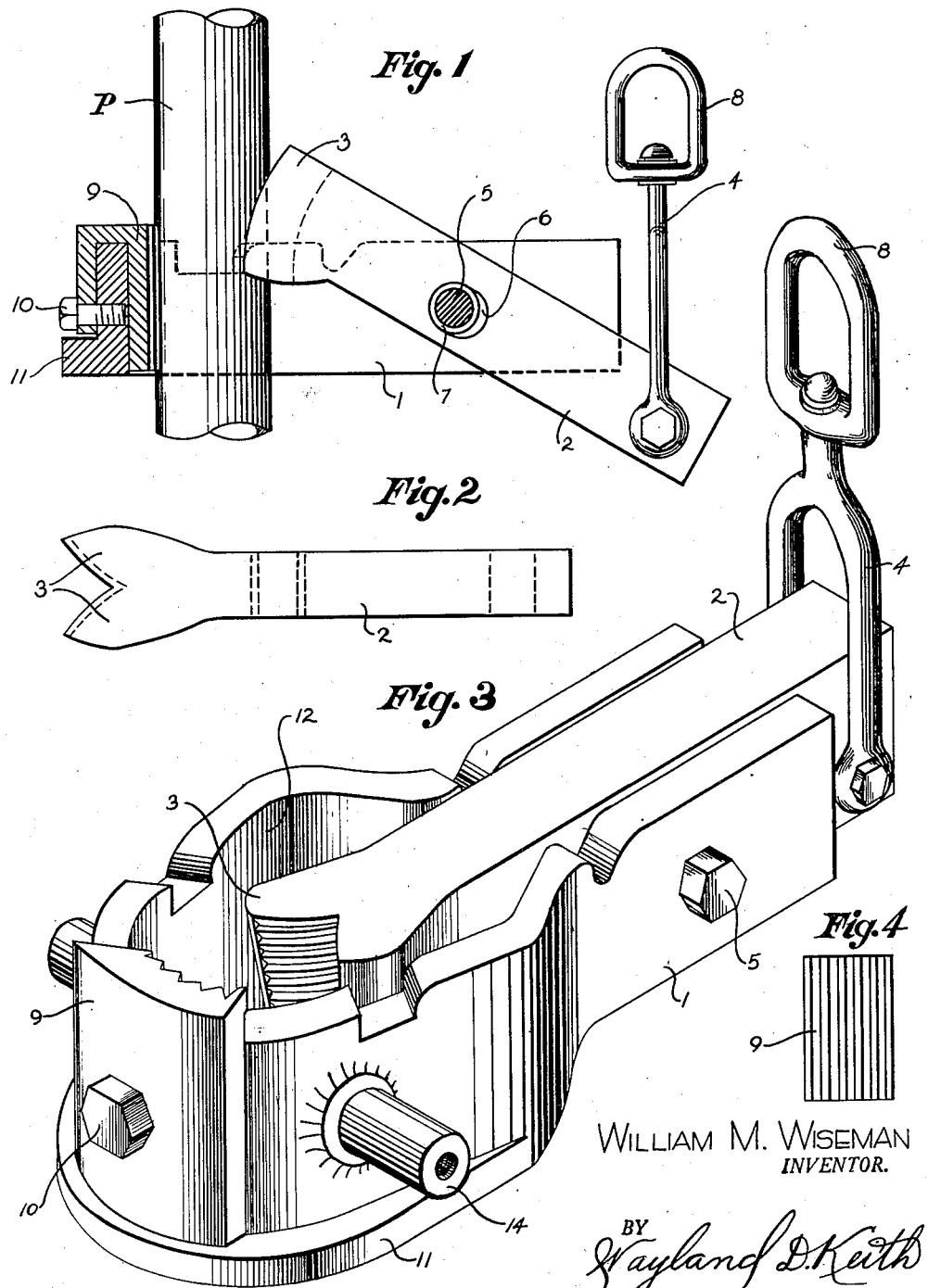
WILLIAM M. WISEMAN
INVENTOR.
BY Wayland D. Keith
HIS AGENT

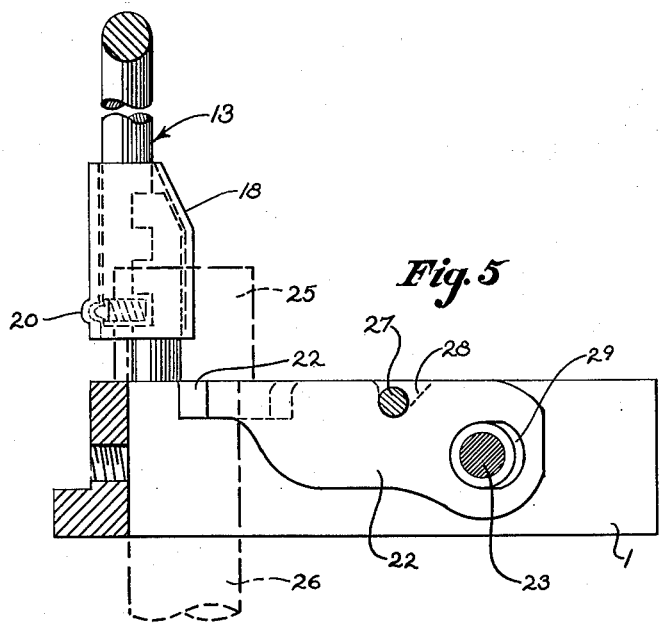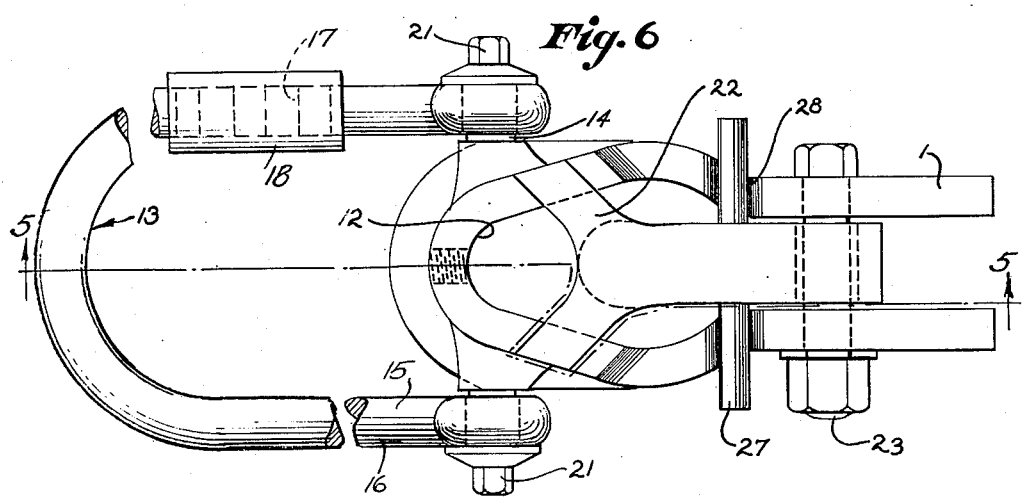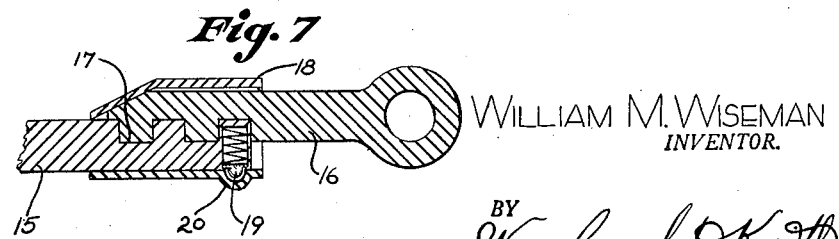

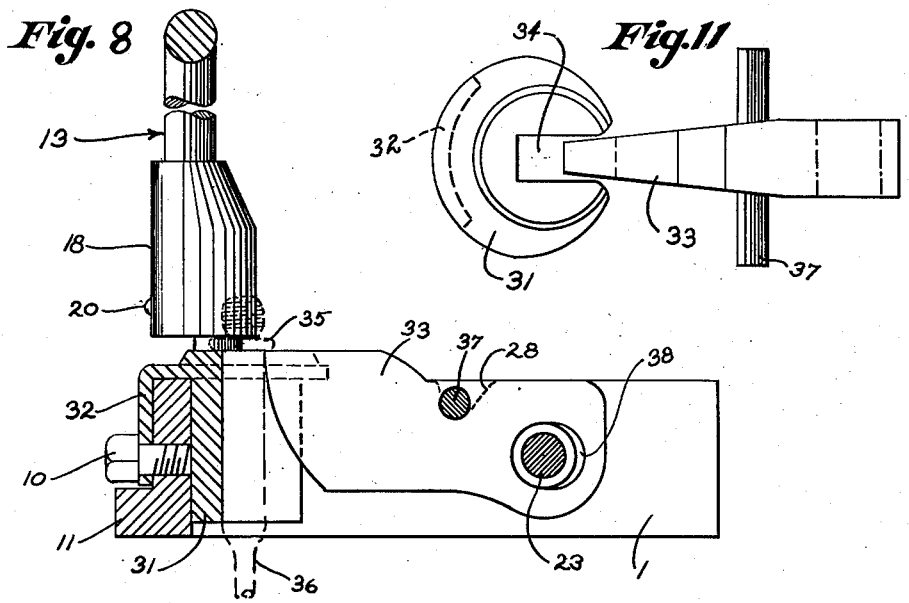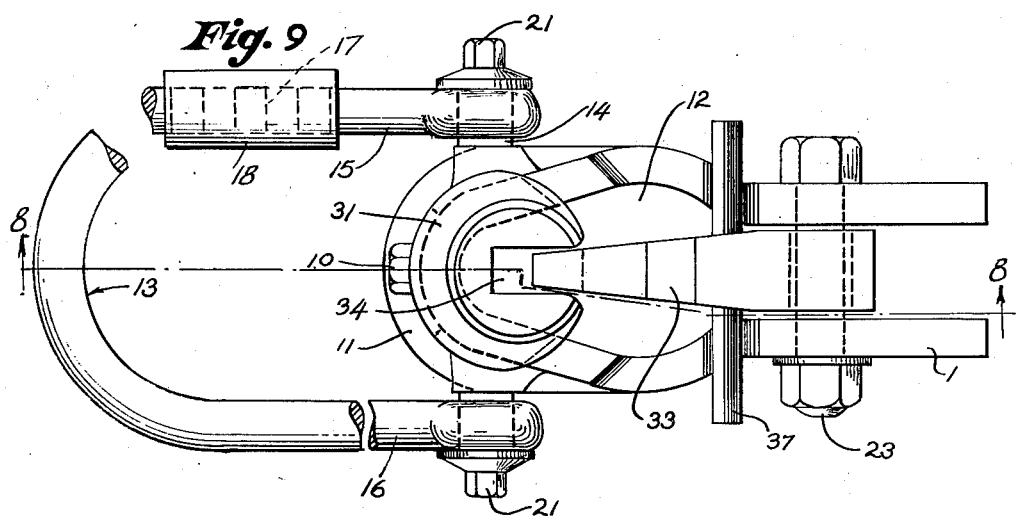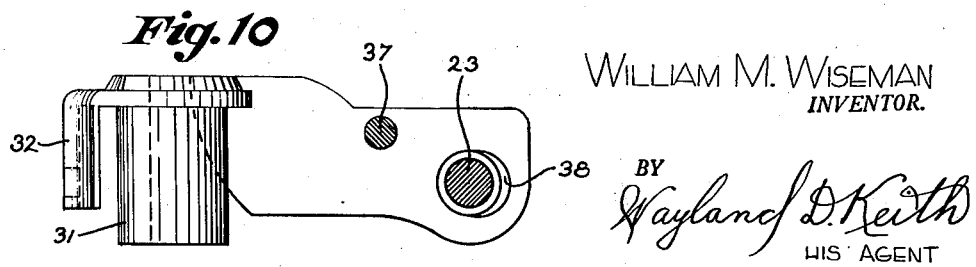

Patented Sept. 18, 1951

2,568,263

UNITED STATES PATENT OFFICE 2,568,263

COMBINATION WRENCH AND ELEVATOR

William M. Wiseman, Henrietta, Tex.

Application July 20, 1945, Serial No. 606,065

6 Claims. (Cl. 294—104)

This invention relates to improvements in a combination wrench and elevator and particularly to a wrench and elevator to be used in placing rod, pipe or tubing in a well or removing them therefrom and for holding the rod, pipe or tubing while coupling or uncoupling thereof is taking place.

The primary object of this invention is to provide for gripping rods or pipe within the length thereof while it is lowered into or raised out of a well.

Another object of this invention is to provide for automatically gripping pipe or rods while exerting torsional action thereon.

Another object of this invention is to provide a combination wrench and elevator that is simple in construction, easy to operate and inexpensive to manufacture; and that will handle either pipe, rod or tubing with a slight change made by an easy and simple interchange of parts.

While the drawings illustrate a preferred embodiment of the invention, it is to be understood that in adapting the same to meet specific needs and requirements, the design may be varied and changes made in the minor details of construction within the scope of the invention as claimed without departing from the spirit thereof.

In the accompanying drawings;

Fig. 1 is a vertical sectional view through one form of the invention showing a fragmentary portion of pipe disposed within the pipe gripping device;

Fig. 2 is a plan view of the dog as removed from the pipe gripping device;

Fig. 3 is a perspective view of the same form of the invention as shown in Fig. 1;

Fig. 4 is an elevational view of a toothed member removed from the device;

Fig. 5 is a side elevational view partly in section of a slightly modified form of the invention adapted to be used with tubing having a coupling on an end thereof;

Fig. 6 is a top plan view of the form of the invention as shown in Fig. 5, with parts broken away and shortened;

Fig. 7 is a longitudinal sectional view through a portion of an elevator bail member showing the manner of locking the coacting parts together;

Fig. 8 is a view similar to Fig. 5 but with the device modified for handling rods;

Fig. 9 is a top plan view of the invention as shown in Fig. 8;

Fig. 10 is a side elevational view of this form of the invention with parts in section, of the rod engaging mechanism as removed from the elevator body; and Fig. 11 is a top plan view of the parts as shown in Fig. 10.

With more detailed reference to the drawing, the numeral 1 designates a body in which various pipe and rod gripping devices may be positioned to meet the requirements of the particular job and the particular parts to be handled.

In the form of the invention as shown in Figs. 1-4 a dog 2, having angularly disposed toothed jaws 3 at one end and a pivotally mounted bifurcated member 4 at the opposite end, is pivoted to the body 1 on an axis pin 5. An elongated hole 6 is disposed within the dog 2 and has a bushing 7 intermediate the elongated hole 6 and the axis pin 5. A loop 8 is swiveled on the upper end of bifurcated member 4, to which a cable may be attached for lifting the elevator wrench unit. The toothed jaws 3 preferably have the teeth thereof transversely positioned.

Opposite the toothed jaw 3 is a toothed member 9 having longitudinally disposed teeth, is secured to the body 1 by cap screws 10.

The body 1 has an out-turned flange member 11 for seating the body on the top of the casing or other suitable foundation.

This form of the invention is adapted to be used in removing tubing from a well or for lowering it thereinto, when it is desired to grip the tubing intermediate the ends thereof and for holding a length of tubing while another length of tubing is coupled thereto or uncoupled therefrom. The outer end portion of the body 1 has an opening 12 therethrough to permit the passing of the tubing therethrough. The dog 2, having angularly formed toothed jaws 3 which are adapted to engage the side of the tubing then by lifting bifurcated member 4 upward by means of a cable attached to loop 8, the pipe P will be urged into binding relation with jaws 9. When the pipe P is positioned in this manner it is held against either downward or rotary movement until released.

An elongated hole 6 is provided in the dog member 2 so that the dog may be easily loosened from the pipe, as by tapping on the outer end of the jaws 3. The loosening may also be accomplished by lifting the pipe upward after the pressure on the bifurcated member 4 has been released.

The member 9 having longitudinally disposed teeth, may be made in a variety of sizes and is adapted to be readily inserted and attached to the body 1 by means of cap screw 10. Thus different sizes of the member 9 may be used to fit the particular size pipe being handled. The teeth of the member 9 are longitudinally disposed to prevent the rotation of the pipe being handled.

In the form of the invention shown in Figs. 5-7, provision is made for attaching a bail member, generally designated as 13, to the body 1. The body 1 has round projecting lugs 14 near an end thereof which receive the eyes of the bail 13. The bail member 13 is comprised of parts 15 and 16 having interengaging teeth 17, which enables the two parts 15 and 16 that compose bail member 13 to be separated to enable the ready removal from and installation on a rigid body 1 without having to distort the bail member, as would be the case in installing or removing a rigid bail member. The teeth 17 are held in engagement by a sleeve 18 sleeved over member 15 and adapted to wedgingly engage member 16. The sleeve 18 is held in a locked position by a spring pressed bolt 19 which engages in a recess 20 in the sleeve 18. The sleeve 18 will depress spring pressed bolt 19 to unlock the sleeve upon upward movement of the sleeve, which will permit separation of bail parts 15 and 16, when the sleeve has passed above the end of the bail portion 16. The members 15 and 16 have loops on their lower ends which form the eyes of the bail and which fit over the round projecting lugs 14 as described above.

The loops are held in place by means of cap screws 21 which are threaded into a hole in each of the round lugs 14.

A forked dog 22 is pivoted on bolt 23 and is adapted to engage beneath a collar 25 on pipe 26 to hold the pipe against downward movement. A bar 27 passes through the body of the dog 22 and rests in a notch 28 in the body 1 to sustain the load of the pipe 26. The bar 27 also serves as a hand hold for operating the dog 22. An elongated hole 29 is provided in dog 22 to permit the dog 22 to readily adjust itself to various sizes of the pipe 26.

The round projecting lugs 14 may be made integral with the body 1, and it is therefore necessary to make the bail generally designated at 13, in two pieces so they can be readily removed when the elevator is being used for other purposes in which the bail is not required.

In the form of the invention as shown in Figs. 5-7, the pipe may be positioned within the loop 12 of the body 1 and the collar set upon the top of forked dog 22 and the top of body 1. The pipe is free to be turned, but any downward movement thereof is arrested. A cable may be attached to bail 13 for raising and lowering the elevator as described above.

In the form of the invention as shown in Figs. 8 to 11, the body 1 and the bail 13 are utilized substantially in the manner described heretofore, but a jaw member 31 is fitted into the loop portion 12 of the body 1 and a projection 32 receives a cap screw 10 therethrough to hold this jaw member in place. A dog 33 is adapted to fit within an opening 34 in the jaw member 31, which opening is below the shoulder 35 of rod 36. This holds the rod in a suspended position and against turning movement while other rods are being connected thereto. The dog 33 is pivoted in a manner similar to the manner that the dog 22 is pivoted, and has an operating handle 37 adapted to seat within notch 28. The elongated hole 38 permits a limited movement of the dog 33 so that it will adjust itself to rods of various sizes.

With the jaws 31 in place in the looped opening 12 of the body 1 and with the dog 33 in a raised position, rods with couplings may be raised through the large open part of the elevator until the coupling is reached. The rod is then swung into the squared opening and the dog lowered into position as shown in Figs. 8 and 9 to hold the rod against downward movement and at the same time the rod is held against turning movement while connections are made.

I claim:

1. In a combination wrench and elevator, the combination of a body constructed for supporting an elongated member, a dog member pivoted to said body and having a jaw thereon positioned to engage and hold said elongated member, said dog member being pivoted to move in a vertical plane, a bifurcated member pivotally mounted on said body and adapted to support said body and said elongated member, said bifurcated member comprising complementary separable parts, a sleeve for normally holding said separable parts in engagement, spring pressed means for holding said sleeve in engagement with said separable parts.

2. In a device for handling rods, a body having a looped end and outwardly extending sides, a jaw member adapted to fit within said looped end of said body and having a squared opening therein, means for securing said jaw member to said body, a dog positioned to close a side of said opening so as to form a substantially squared opening to receive the squared portion of a rod member, a projection positioned on said dog to engage a notch in said body to hold said dog in a substantially horizontal position, said projection also being adapted to extend outwardly from said body to form an operating handle to raise and lower said dog.

3. In an elevator, an elongated supporting body including substantially parallel sides joined together at one end of the body by a loop portion, said loop portion being enlarged diametrically to a greater diameter than the space of the sides and at a point spaced from the adjacent end of the body, said loop portion having opposite sides converging in a non-circular relation at an acute angle to each other and tapering from said enlarged portion toward the adjacent end of the body to receive an elongated member within said loop portion, and a jaw member pivotally mounted between the sides and having an end portion in position to bear against said elongated member in the loop portion to hold said member in supporting relation on the elevator.

4. In an elevator, an elongated supporting body including substantially parallel sides joined together at one end of the body by a loop portion, said loop portion being enlarged diametrically to a greater diameter than the space of the sides and at a point spaced from the adjacent end of the body, said loop portion having opposite sides converging in a non-circular relation at an acute angle to each other and tapering from said enlarged portion toward the adjacent end of the body to receive an elongated member within said loop portion, and a jaw member pivotally mounted between the sides and having an end portion in position to bear against said elongated member in the loop portion to hold said member in supporting relation on the elevator, said body having support members thereon and projecting outwardly in opposite directions therefrom for engagement to support the elevator.

5. In an elevator, including a body having means for supporting an elongated member thereon, a bail member for supporting the body, said bail member including separable parts having notched faces in interfitting relation, and a sleeve slidably mounted on said parts in embracing relation and holding said parts in said interfitting relation.

6. In an elevator, including a body having means for supporting an elongated member thereon, a bail member for supporting the body, said bail member including separable parts having notched faces in interfitting relation, a sleeve slidably mounted on said parts in embracing relation and holding said parts in said interfitting relation, and means for yieldably holding said sleeve in position on said parts.

WILLIAM M. WISEMAN.

REFERENCES CITED

The following references are of record in the file of this patent:

UNITED STATES PATENTS

| Number | Name | Date |
|---|---|---|
| 221,958 | Fair | Nov. 25, 1879 |
| 957,091 | Preston | May 3, 1910 |
| 1,014,504 | Miller | Jan. 9, 1912 |
| 1,186,672 | Maginnis et al. | June 13, 1916 |
| 1,264,472 | Artzt | Apr. 30, 1918 |
| 1,397,072 | Black | Nov. 15, 1921 |
| 1,737,029 | Shaffer | Nov. 26, 1929 |
| 2,145,066 | Wright | Jan. 24, 1939 |